United States Patent [19]
Matsui et al.

[11] 3,752,616
[45] Aug. 14, 1973

[54] MIX-SPINNING APPARATUS

[75] Inventors: Masao Matsui, Takatsuki; Masahiro Yamabe, Neyagawa, both of Japan

[73] Assignee: Kanegafuchi Boseki Kabushiki Kaisha, Tokyo, Japan

[22] Filed: May 13, 1971

[21] Appl. No.: 143,217

Related U.S. Application Data

[62] Division of Ser. No. 783,508, Dec. 13, 1968, Pat. No. 3,613,173.

[30] Foreign Application Priority Data

Dec. 20, 1967    Japan.................................. 42/82022
Feb. 27, 1968    Japan.................................. 43/12426

[52] U.S. Cl............... 425/131, 425/382.2, 425/463, 259/4
[51] Int. Cl.......................................... D01d 3/00
[58] Field of Search................... 425/382, 131, 132, 425/133, 198, 464, 463; 264/176 F, 177

[56] References Cited
UNITED STATES PATENTS 3,613,173   10/1971   Matsui et al..................... 425/131 X
3,239,197    3/1966   Tollar................................. 259/4
3,469,279    9/1969   Hudgell........................... 425/198
3,500,498    3/1970   Fukuma.......................... 425/133
3,425,091    2/1969   Ueda................................ 425/463
3,480,996   12/1969   Matsui.............................. 425/382
3,382,534    3/1968   Veazey............................. 425/192

Primary Examiner—J. Spencer Overholzer
Assistant Examiner—Michael O. Sutton
Attorney—Stevens, Davis, Miller & Mosher

[57] ABSTRACT

A spinning apparatus capable of manufacturing a multi-layer filament from at least two-spinning materials by using a layer-multiplying mixer consisting of a three-dimensional passage network which include at least two network elements arranged in successive stages, the network element being composed of repeated unit passages arranged on a plane, whereby the spinning materials are joined and separated in different phase in multi-stages.

6 Claims, 77 Drawing Figures

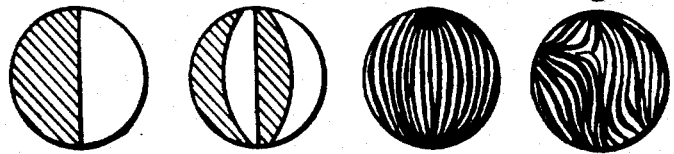
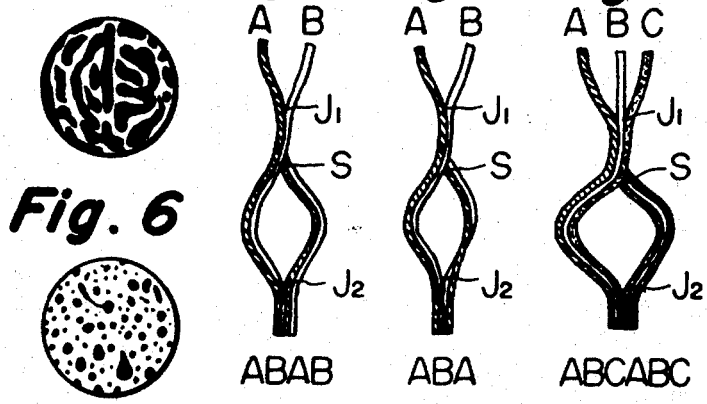
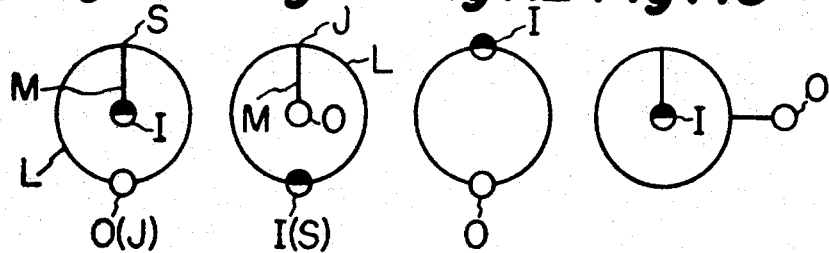

Patented Aug. 14, 1973

Patented Aug. 14, 1973 3,752,616

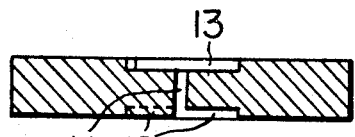
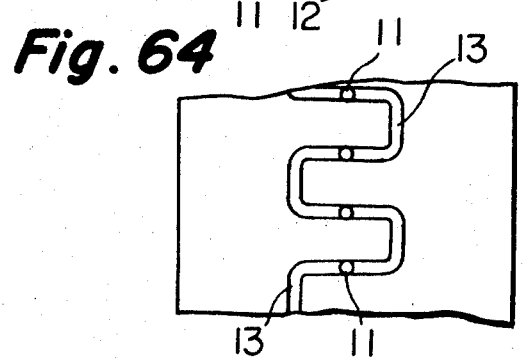
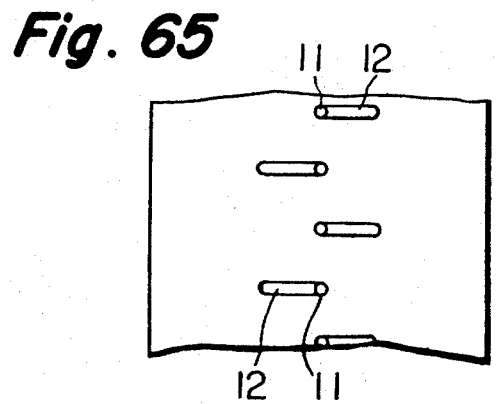

MIX-SPINNING APPARATUS

This application is a division of our co-pending application Ser. No. 783,508, filed Dec. 13, 1968, and now U.S. Pat. No. 3,613,173.

This invention relates to a mix-spinning apparatus capable of easily manufacturing a mixed filament, particularly a multi-layer filament comprising a plurality of components laminated one upon the other to form a unitary filament.

A multi-layer filament comprising at least two different kinds of components laminated one upon the other substantially continuously along an axial direction of a unitary filament has many important advantages and improved properties when compared with a conventional filament having a granular or needle like mixed construction. For example, the conventional mixed filament has such construction that it is not continuous in its longitudinal direction and hence the filament when subjected to tensile stress, bending stress or elongation is apt to restore to its original state in a lesser extent. The multi-layer filament has not such disadvantage inherent to the non-continuous construction. However, it is considerably difficult to spin the multi-layer filament in an efficient manner. Apparatuses for spinning the multi-layer filament which are extremely complex in construction and difficult in maintenance are described in Belgian patent specification No. 694,233 and French patent specification No. 1,495,835. A comparatively simple apparatus is described in U.S. Pat. No. 3,382,534. This apparatus makes it quite difficult to spin simultaneously uniform multi-layer filament through, for example, a number of orifices.

The principal object of the invention is to provide a spinneret adapted to manufacture the above mentioned multi-layer filament, particularly uniform mixed filament in a highly efficient manner.

Another object of the invention is to provide a mix-spinning apparatus which is comparatively simple in construction and can easily be manufactured, assembled and maintained.

The inventors proposed in Dutch patent application No. 6,803,699 a spinning apparatus which is comparatively simple in construction and adapted to efficiently manufacture a uniform multi-layer filament. The spinning apparatus proposed by the inventors comprises a member for supplying spinning material, a spinneret plate, and a mixer consisting of a plurality of reservoirs located between the member for supplying the spinning material and the spinneret plate, and distributing passages for communicating the reservoirs each other. Such mixer or spinneret has the advantage that it can be manufactured in an extremely simple manner, but has the disadvantages that it cannot be made small without difficulty and that the flow of the spinning material becomes irregular. That is, the presence of the reservoirs affords the limitation that the apparatus cannot be made small, while the flow of the spinning material is easily disturbed owing to occurrence of stagnation of the spinning material therein. It is a matter of course that the above mentioned spinneret is useful owing to its simple construction irrespective of the above mentioned disadvantages.

The invention makes use of a layer-multiplying mixer having no reservoirs, that is a mixer consisting of passages only. The passage means a narrow path admitting the flow of the spinning material.

The spinning apparatus according to the invention is characterized in comprising I. a member for supplying at least two different kinds of spinning materials, a spinneret plate having at least one orifice, and a mixer for stratifying said spinning materials into multi-layers and interposed between the member and the spinneret, II. said mixer consisting of a three-dimensional passage network which includes at least two "network elements" arranged in successive stages, an outlet portion of the network element at each stage being connected to an inlet portion of the network element at the next stage, III. the main part of said network element including at least one, preferably at least two "unit passages" arranged on a substantial plane in a regular manner, IV. said unit passage including
 a. a main passage having at least one branch on a substantial plane and at least one inlet through which the spinning materials flow in a direction substantially perpendicular to said plane and at least one outlet through which the spinning materials flow out in a direcection substantially perpendicular to said plane,
 b. said inlet and outlet being arranged alternately along said main passage,
 c. said inlet and outlet being provided on said branch and/or main passage, V. at least two different kinds of spinning materials supplied into said mixer being joined and separated at least two stages in different phase and flowed out from the orifices.

As seen from the above, the method of spinning multi-layer filament according to the invention is based on such idea that different kinds of spinning materials are joined and separated at many stages thus forming the spinning materials into a multi-layer filament.

For a better understanding of the invention, reference is taken to the accompanying drawings, of which FIG. 1 is a sectional view of a conventional side-by-side type composite filament obtained by joining two spinning materials at one time;

FIG. 2 is a sectional view of a four-layer filament according to the invention;

FIG. 3 is a sectional view of a filament having a grainy multi-layer construction according to the invention;

FIG. 4 is a sectional view of a filament having a distorted grainy multi-layer construction according to the invention;

FIG. 5 is a sectional view of a filament having an archipelagic configuration according to the invention;

FIG. 6 is a sectional view of a filament having a nebular configuration according to the invention;

FIG. 7 is a view illustrating a basic method of stratifying two spinning materials into multi-layers;

FIG. 8 is a similar view to FIG. 7 illustrating a modified method of multiplication of layer;

FIG. 9 is a view illustrating a method of stratifying three spinning materials into multi-layers according to the invention;

FIGS. 10 – 13 are diagrams showing various embodiments of a network element having one inlet and one outlet;

FIG. 63 is a vertical sectional view of another distributing plate;

FIG. 64 is a plan views showing upper surface of the distributing plate shown in FIG. 63;

FIG. 65 is a bottom view of the distributing plate shown in FIG. 63;

Figure 66:
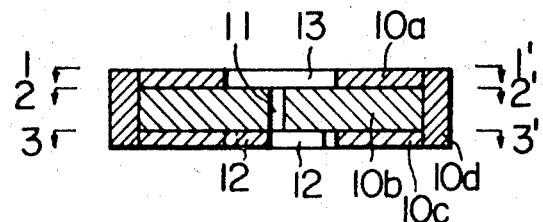
FIG. 66 is a vertical sectional view of a distributing plate composed of three plates.
Figure 67:
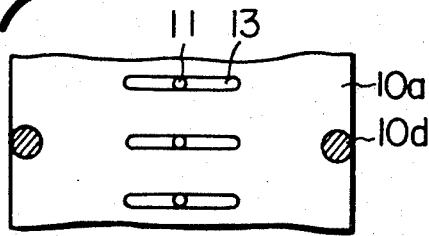
Figure 68:
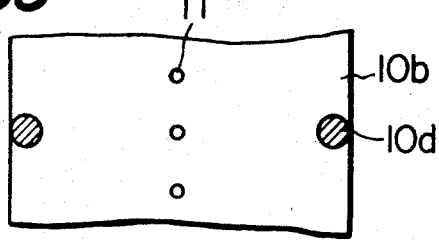
Figure 69:
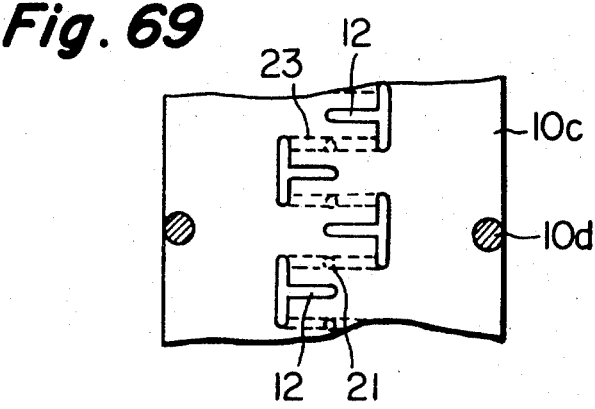
Figure 70:
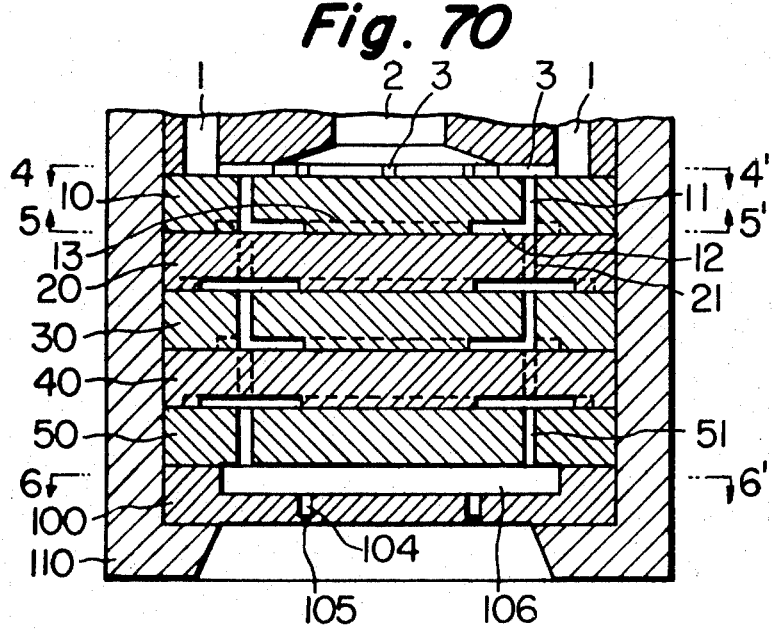
Figure 71:
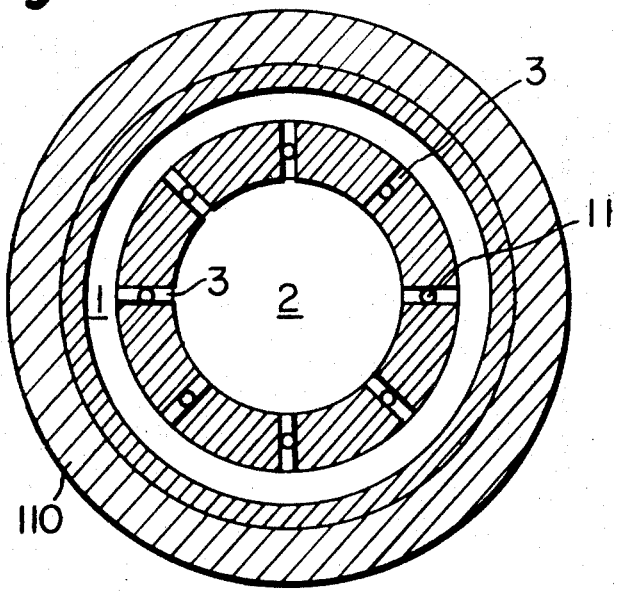
Figure 72:
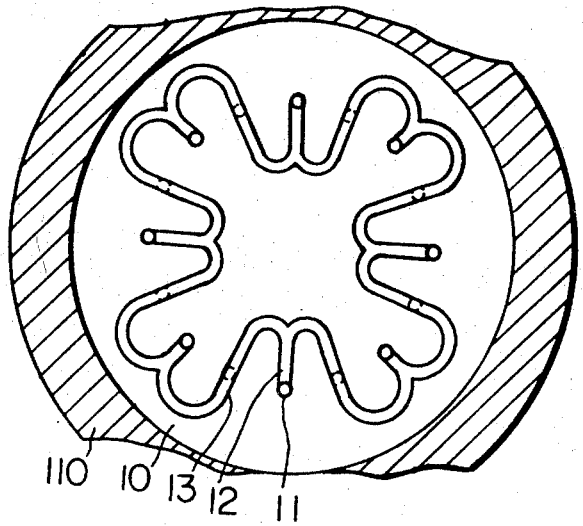
Figure 73:
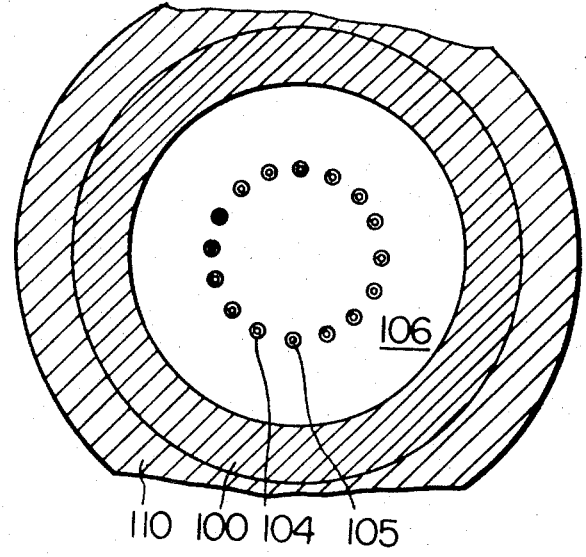
Figure 74:
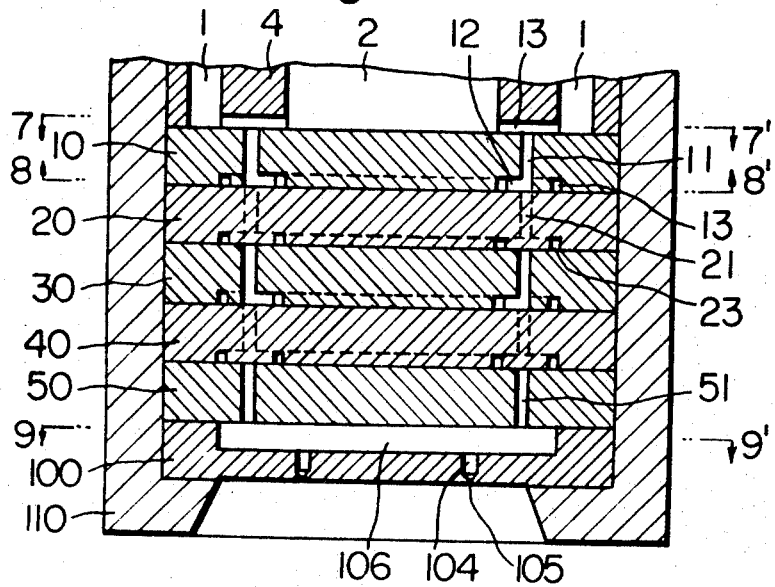
Figure 75:
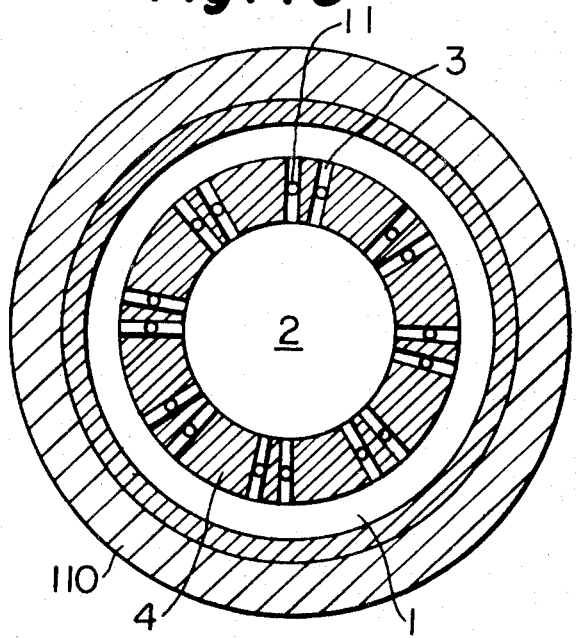
Figure 76:
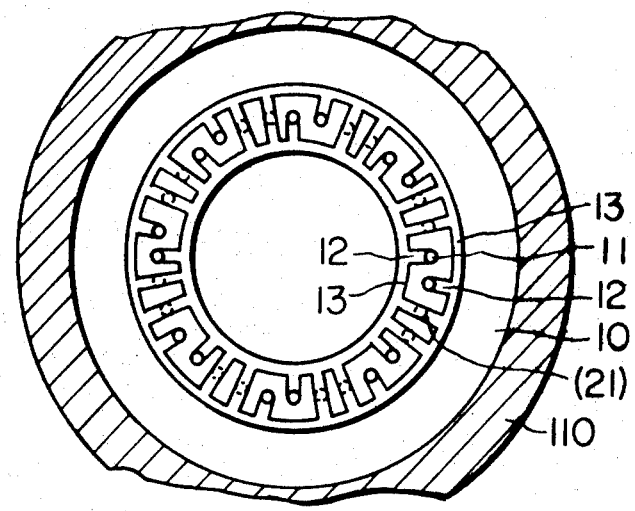
Figure 77:
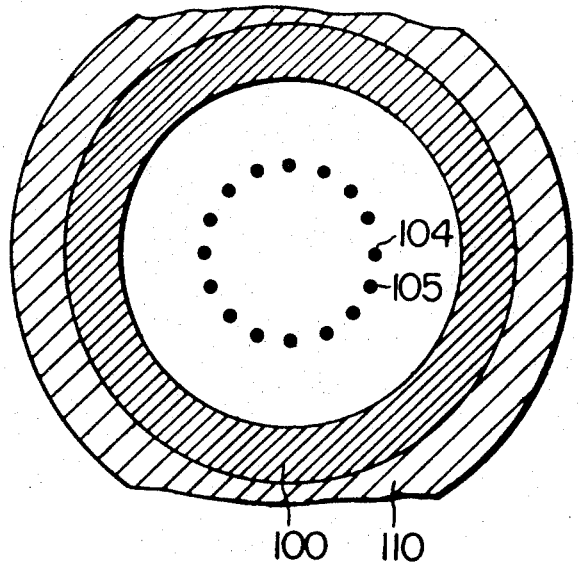

FIGS. 67, 68 and 69 are cross-sectional views of the distributing plate shown in FIG. 66 taken on lines 1–1', 2–2' and 3–3' respectively in the arrow direction;

FIG. 70 is a vertical sectional view of a spinneret having a zigzag type element according to the present invention;

FIGS. 71, 72 and 73 are cross-sectional views of the spinneret shown in FIG. 70 taken on lines 4–4', 5–5' and 6–6' respectivley in the arrow direction;

FIG. 74 is a vertical sectional view of a spinneret having a ladder type element according to the present invention; and FIGS. 75, 76 and 77 are cross-sectional views of the spinneret shown in FIG. 74 taken on lines 7–7', 8–8' and 9–9' respectively in the arrow direction.

Referring now to FIG. 7, two spinning materials A and B are joined at a point $J_1$ to form a component AB and then the component AB thus formed is separated at a point $S_1$ into two components AB and AB. The two components AB and AB thus formed are joined again at a point $J_2$ into a four layer structure ABAB. The spinning materials are joined and separated such that the component AB is separated at the point $S_1$ into two components AB and AB with the joined state remained at least partly, preferably completely as they were and that the two components AB and AB are joined at the point $J_2$ into the four layer structure ABAB so as to add at least partly, preferably completely the joined states. That is, the joining direction of spinning materials is different from the separating direction of spinning materials, and, it is most practical and efficient that the difference of the directions is 90°. The above mentioned joining and separating are called "joining and separating in different phase". If the joining and separating are effected in the same phase, i.e. in the same direction, the two spinning materials A and B could not be layer-multiplied.

FIG. 1 shows in section a conventional side-by-side type composite filament obtained by joining two spinning materials A and B at one stage.

FIG. 2 shows in section a filament obtained by joining and separating the two spinning materials at two stages in the manner explained with reference to FIG. 7.

FIG. 3 shows in section a filament obtained by joining and separating the two spinning materials at a number of stages successively.

Calculation shows that the number of the layers constituting the filament obtained by joining and separating the two spinning materials successively at $n$ stages as shown in FIG. 7 is $2^n$. n is called a number of joining and separating stages. The filament obtained by joining and separating in different phase at a number of stages shows a more or less distortion as shown in section in FIG. 4. In practice the number of layers of the filament is given by a value which is more or less larger or smaller than the above mentioned calculated value $2^n$ owing to irregular disturbance of the flow of the spinning materials in spinneret.

FIG. 7 shows a basic type flow of the spinning materials in the method to multiply the layer. In practice many modifications thereof may occur to those skilled in the art. FIGS. 8 and 9 show examples of such modifications.

If the joining at the point $J_2$ is not perfect as shown in FIG. 8, the number of layers is not so much increased efficiently.

Calculation also shows that the number of layers constituting the filament obtained by joining and separating three spinning materials successively n stages as shown in FIG. 9 is $3 \times 2^{n-1}$.

As above mentioned, if the two spinning materials are joined and separated at a number of stages successively in different phase, a filament having a grainy multi-layer construction as shown in FIG. 3 is obtained. However, the irregular disturbance of the flow of the spinning material in the spinnerets often results in a filament having a distorted grainy construction as shown in FIG. 4. If use is made, for example, of polyester and polyamide having no affinity each other as the spinning materials, a multi-layer filament obtained has often an archipelagic construction as shown in FIG. 5 or a nebularly distributed construction as shown in FIG. 6.

Each of main layers in the multi-layer filament shown in FIGS. 5 and 6 is substantially continuous in the longitudinal direction of the filament.

The network element (hereinafter is abridged as "element") or unit passage according to the invention will now be explained with reference to the drawing.

FIG. 10 shows an embodiment of the smallest element. This element consists of a unit passage. The element or unit passage shown in FIG. 10 consists of a circular main passage L, one branch M, one inlet I and one outlet O. The spinning materials supplied to the inlet I connected to the branch M are separated at a point S and joined at a point J and then flow out of the outlet O. In the element (or unit passage) shown in FIG. 10 the main passage L is provided with the outlet O which is the same as the point J where the spinning materials are joined together. A small circle shown by black and white at the inlet I designates a phase or direction in which the spinning materials joined together.

FIG. 11 shows another element in which the main passage L is provided with the inlet I and the branch M is provided with the outlet O, while the inlet I is the same as the separating point $S_1$ and the branch M and the main passage L cross at the joining point J. Thus, the main passage L may be provided with the inlet I and the branch M may be provided with the outlet O. However, it is not desirable that the main passage L is provided with both of the inlet I and the outlet O as shown in FIG. 12 and that the branch M are provided with both of the inlet I and the outlet O, as shown in FIG. 13, since in these cases the number of layers is not so much increased efficiently.

The main passage L may be provided at any point thereof and in any direction with the branch M. The branch M may be connected to the main passage L at a direction not perpendicular thereto. The main passage L and the branch M may be curved. But, it is necessary to arrange the branch M and the main passage L in a substantial plane. As will be described hereinafter, the unit passage and the element should preferably be regular in construction.

Figures 14, 15, 16, 17, 18:
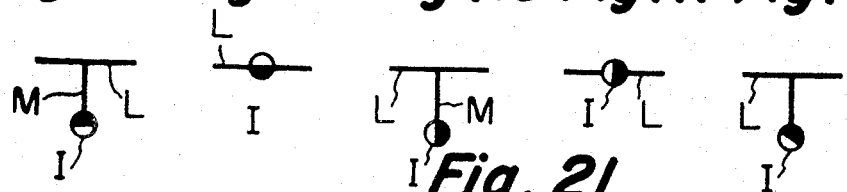
FIGS. 14 – 18 are diagrams illustrating various methods of supplying spinning materials into an inlet.

It is most preferable to supply the spinning materials through the inlet I to the branch M in a phase shown in FIG. 14 or to the main passage L in a phase shown in FIG. 15. But, it is worst to supply the spinning materials through the inlet I to the branch M in a phase shown in FIG. 16 or to the main passage L in a phase shown in FIG. 17. The methods of supplying the spinning materials in phases shown in FIGS. 16 and 17 considerably reduce the layer-multiplying efficiency. An intermediate layer-multiplying efficiency is given by the method of supplying the spinning materials shown in FIG. 18.

FIGS. 19 – 30 show at the upper parts thereof changes of the layers of the spinning materials when they are joined and separated at the passages in perspective view and at the lower parts thereof in parenthesis corresponding passages in diagram.

Figures 19, 20, 21, 22:
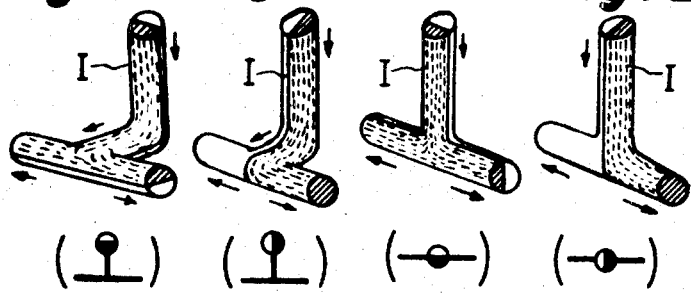
FIGS. 19 – 30 are perspective views illustrating separating and joining states of spinning materials at the passage.

FIG. 19 and 20 show embodiments in which the branch M is provided at its end with the inlet I. In the embodiment shown in FIG. 19 the spinning materials are supplied into the inlet I in the most preferable phase; while in the embodiment shown in FIG. 20 the spinning materials are supplied into the inlet I in the worst phase.

FIGS. 21 and 22 show embodiments in which the main passage L is provided with the inlet I. In the embodiment shown in FIG. 21 the spinning materials are supplied into the inlet I in the most preferable phase, while in the embodiment shown in FIG. 22 the spinning materials are supplied into the inlet I in the worst phase.

FIGS. 23 – 26 show embodiments in which the main passage L is provided with the outlet O. In the embodiments shown in FIGS. 23 and 25 the spinning materials are joined and then supplied into the outlet O in the most preferable phase so as to increase the number of layers in the most efficient manner, while in the embodiments shown in FIG. 26 the spinning materials are joined and then supplied into the outlet O in the worst manner without increasing the number of layers. For example, in the embodiment shown in FIG. 24 the spinning materials are joined with the aid of the element shown in FIG. 10 in a manner shown in FIG. 8.

FIGS. 27 – 30 show embodiments in which the branch M is provided at its end with the outlet O. In the embodiments shown in FIGS. 27 and 29 the spinning materials are joined and then supplied into the outlet O in the most efficient manner, while in the embodiment shown in FIG. 28 the spinning materials are joined and then supplied into the outlet O in less efficient manner and in the embodiment shown in FIG. 30 the spinning materials are joined and then supplied into the outlet O in the worst manner without increasing the number of layers.

Figures 23, 24, 25, 26:
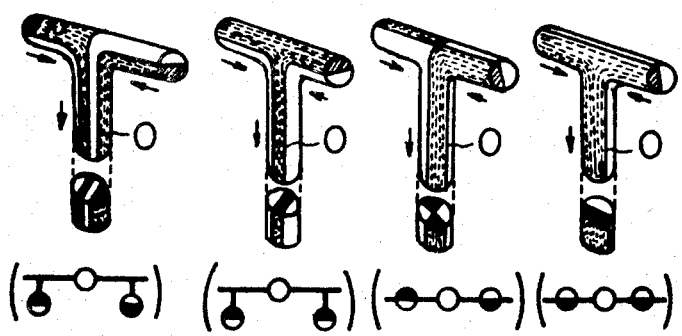
Figures 27, 28, 29, 30:
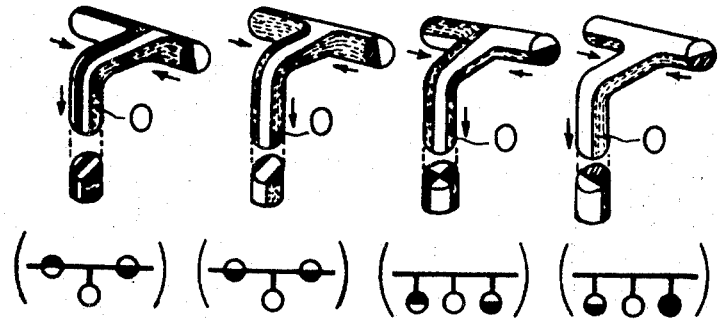
Figures 31, 32, 33, 34:
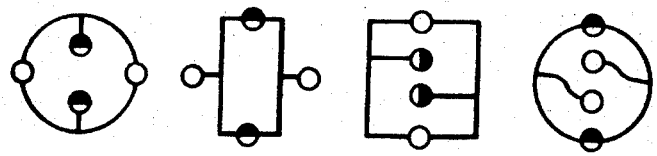
FIGS. 31 – 34 are diagrams showing several embodiments of a unit passage having two inlets and outlets, and two branches, respectively.

In the embodiments shown in FIGS. 23, 25, 27 and 29 the spinning materials are joined in completely different phase, but in practice the embodiments shown in FIGS. 23 and 27 are most useful. Similarly, the embodiments shown in FIGS. 19 and 21 are most useful for separating the spinning materials in different phase. The reason why these embodiments are most useful will be described hereinafter with reference to series connection of the elements.

It will easily be understood that the element shown in FIG. 10 is a combination of the embodiment for separating the spinning materials shown in FIG. 19 and the embodiment for joining the spinning materials shown in FIG. 24, and that the element shown in FIG. 11 is a combination of the embodiment for separating the spinning materials shown in FIG. 21 and the embodiment for joining the spinning materials shown in FIG. 28. Thus, the elements shown in FIGS. 10 and 11 are capable of joining the spinning materials an imperfect manner only. In order to increase the layer-multiplying efficiency, it is necessary to provide at least two inlets I and outlets O, respectively.

FIGS. 31 – 34 show embodiments of an element including two inlets I, outlets O and branches M, respectively. Such elements may be considered to be a combination of two unit passages (repeating unit) each consisting of a couple of the inlet and outlet. Various modifications of the shape of the main passage L and branch M and the arrangement of the outlet O, inlet I and branch M may be made as shown in FIGS. 31 – 34.

In order to efficiently spin a uniform mixed filament with the aid of a large number of orifices, the number of the inlet or the number of the outlet of one element should, for example, be more than 4 and particularly be more than 8. For this purpose independent elements may be arranged in parallel. But, such parallel arrangement is not desirable in view of the fact that the arrangement makes the spinning apparatus complex in construction, that the spinning apparatus cannot be made small in size, and cannot be maintained in an easy manner. Thus, it is most preferable to arrange a number of units (unit passage) to form an element. An element including a number of unit passages to the invention will now be described with reference to FIGS. 35 – 57.

As above described, the inlet I and the outlet O are alternately arranged. The element or unit passage is classified into three groups in accordance with the arrangement of the inlet I and the outlet O.

Figures 35, 36, 37, 38, 39:
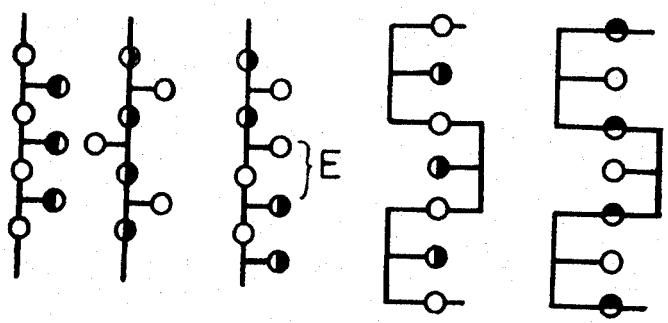
FIGS. 35 – 57 are diagrams showing various embodiments of the network element composed of the various unit passages (repeating units)

The first group includes the inlet I provided on the branch M and the outlet O provided on the main passage L. The second group includes the inlet I on the main passage L and the outlet O on the branch M. The third group is a combination of the first and second groups. FIG. 35 shows an embodiment of the first group, FIG. 36 an embodiment of the second group and FIG. 37 an embodiment of the third group. The third group sometimes produces at its one part an imperfect portion E as shown in FIG. 37.

The element or unit passage is classified into six types in accordance with the shape of the main passage L.

The first type is one in which the main passage L is made linear (straight line or slowly inclined curve). FIGS. 35 – 37 show embodiments of the first type including the linear type main passage L (This type is called as a linear type hereinafter).

The second type is one in which the main passage L is made zigzag. FIGS. 38 – 42 show embodiments of the second type including the zigzag type main passage L (This type is called as a zigzag type hereinafter.).

The third type is one in which the main passage L is made into a ladder in shape. FIGS. 43 – 49 show embodiments of the third type including the ladder type main passage L (This type is called as a ladder type hereinafter.).

Figures 50, 51:
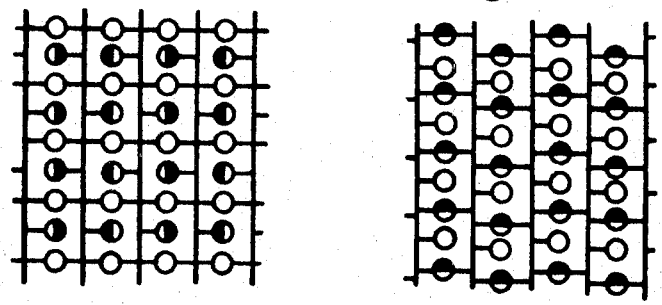
Figure 52:
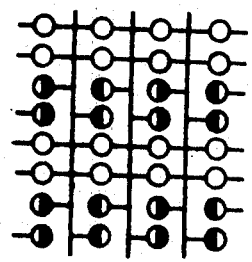

The fourth type is one in which the main passage L is made into a lattice in shape. FIGS. 50 – 52 show embodiments of the fourth type including the lattice type main passage L (This type is called as a lattice type hereinafter.).

The fifth type is one in which the main passage L is made into a closed loop. FIGS. 57 and 70–77 show embodiments of the fifth type including the closed loop type main passage L (This type is called as a closed loop type hereinafter.). This closed loop type is further classified into four types, i.e. linear type, zigzag type, ladder type and lattice type.

The sixth type is a combination of the above mentioned five types.

Figure 53:
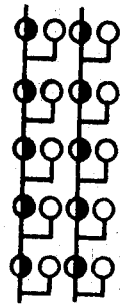

The linear type element is the most basic element. The linear type element shown in FIGS. 35 – 37 might be considered to be difficult to connect them in multi-stages and to be less practicable. But, the linear type element may easily be connected in multi-stages if the branch M thereof is bent as shown in FIG. 53.

The zigzag type element is extremely useful. It will be seen that the zigzag type element shown in FIGS. 38 – 42 may easily be connected in multi-stages. Similar to the zigzag type element, the ladder type element and the lattice type element may easily be connected in multi-stages and are extremely useful.

Figure 59:
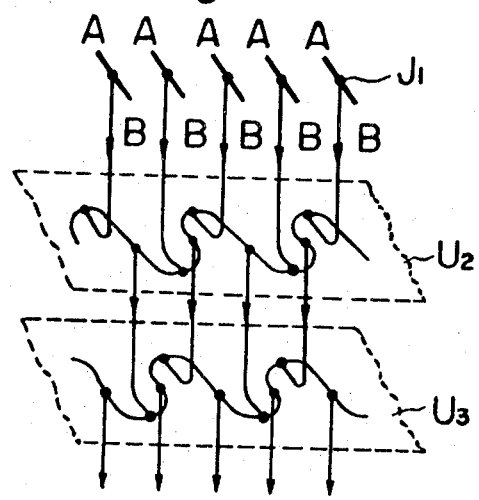

The shape of the main passage of the zigzag type element is not limited to zigzag, but includes a gently inclined curve such as a sine curve as shown in FIG. 59 or more complex or irregular curves. That is, periodically or oscillatory changing curves may be considered as the zigzag curves.

Figures 40, 41, 42, 43, 44:
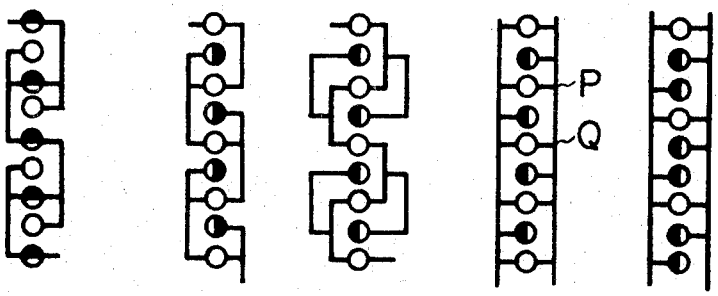

The ladder type element is particularly easy to manufacture. The ladder type element shown in FIG. 43 is the most basic element. The ladder type element shown in FIG. 43 is closely related to the zigzag type element shown in FIG. 38. One of the problems encountered with the elements shown in FIGS. 43 and 45 lies in occurrence of stagnation of the spinning materials therein. That is, if each passage is completely symmetrical each other, the spinning materials cause stagnation in the passage located between points P and Q and hence do not flow therethrough. The symmetry of the passage means "symmetry of resistance against the flow of the spinning materials in the passage". If the passage is completely symmetrical, the spinning materials are joined at the joining point with a rate of 1/1 and equally separated at the separating point.

Figures 45, 46, 47, 48, 49:
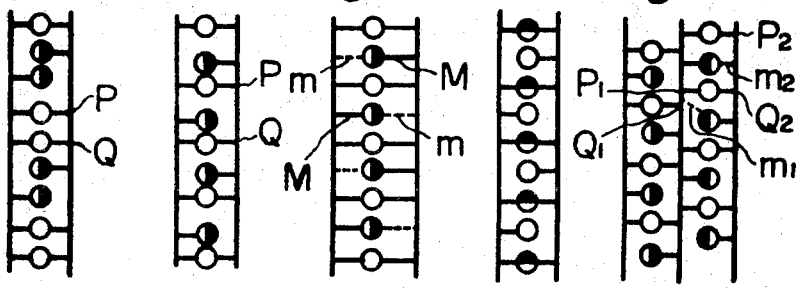

The element according to the invention may be symmetrical or unsymmetrical. In order to prevent stagnation of the spinning materials in the ladder type element the passage must be made unsymmetrical. In order to make the passage unsymmetrical the diameter or length of the passage may be changed. FIGS. 44 and 47 show embodiments in which the length of the passage is changed. In the element shown in FIG. 46 there is produced a pressure difference between points P and Q, so that stagnation of the spinning materials does not occur.

In the embodiments shown in FIGS. 44 and 45, the outlet O and the inlet I are called to be alternately arranged. That is, at least one inlet I and at least one outlet O may alternately be arranged.

Figure 55:
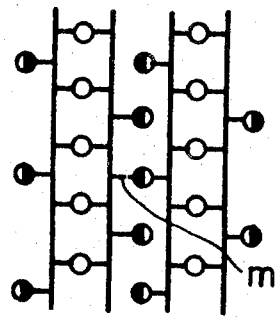

FIG. 47 shows an embodiment in which provision is made of auxiliary branch m as shown by dotted lines for the purpose of preventing stagnation of the spinning materials. The auxiliary branch m should be smaller in diameter or longer in length when compared with the branch M, otherwise the branch M would not serve as a branch. For example, the spinning materials flowing through the auxiliary branch m should be less than one half, preferably less than one fourth that flowing through the branch M. Another embodiments including such auxiliary branch m are shown in FIGS. 49 and 55.

As above mentioned, a number of modified embodiments of the element or unit passage may be obtained by changing the arrangement of the branch and the connection of the branch with the main passage, by bending the branch and main passage and by replacing the inlet with the outlet. For example, the embodiment shown in FIG. 39 corresponds to that shown in FIG. 38 in whch the inlet and outlet are replaced by the outlet and inlet, respectively. The inlet and outlet are determined after the elements have been connected in multi-stages so that such multi-stage connection constitutes an extremely important problem. The multi-stage connection of the elements will be described later, but other modifications of the elements are possible for those skilled in the art for the purpose of layer-multiplying as possible or of increasing the mixing efficiency is referred to FIGS. 19 – 30.

Figure 54:
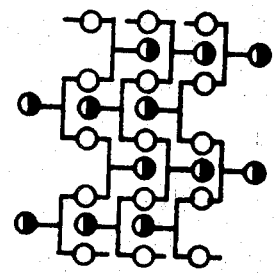
Figure 56:
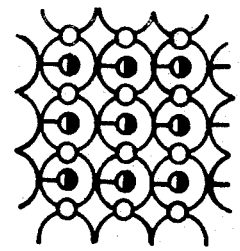
Figure 57:
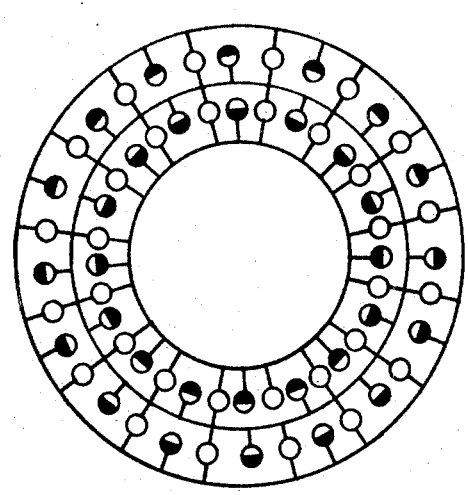

The element according to the invention is developed in substantially flat plate. A plurality of elements may be arranged in parallel in the same plane to increase the number of the inlet and outlet. FIGS. 53 shows an embodiment in which two linear type elements are arranged in parallel. FIG. 54 shows an embodiment in which three zigzag type elements are arranged in parallel. FIG. 55 shows an embodiment in which two ladder type elements are arranged in parallel. It is desirable to make the element as regular as possible for the purpose of rendering the manufacture and assembling thereof easy and the mixing efficiency uniform. The linear, zigzag, ladder or lattice type element is intended to make its terminal portion irregular or imperfect. Such imperfect terminal portion when it is not essential part of the element is allowable, but not desirable. In order to obtain the element having substantially no imperfect portion, the element should be made as a closed loop type element having no terminal portions. It is possible to change the linear, zigzag, ladder or lattice type element into the closed loop type element by closing the main passage. An embodiment shown in FIG. 57 is formed by closing the main passages of double ladder type element. An embodiment shown in FIG. 72 is formed by closing the zigzag type shown in FIG. 38. Particularly, the element including at least 4, preferably at least 8 inlets I and outlets O arranged along a circle is mot suitable as a spinneret for spinning a mixed filament through a number of orifices arranged along the circle. Similarly, the embodiment including circular main passages as shown in FIG. 57 can easily be manufactured with the aid of a lathe and hence is extremely useful in practice. FIG. 56 shows another embodiment in which the main passages of the lattice type element are closed into circles and which is also easy to manufacture in a manner similar to the embodiment shown in FIG. 57.

As described above, the inventors provide layer-multiplying mixer consisting of reservoirs and passages for connecting these reservoirs each other. Such reservoir may be formed by enlarging the linear portions of the main passages of the element shown in FIG. 43 or the element shown in FIG. 48. The function of the reservoir is, however, considerably different from that of the main passage.

For instance, the residence time of the spinning materials in the reservoir is entirely different from that in the passage (narrow path). The layer-multiplying mixer may preferably be formed by the passage only instead of the reservoir in order to decrease disturbance of spinning materials. The cross-section of the reservoir is made larger than that of the passage. In general, the cross-section of the reservoir is made at least five times, preferably at least 10 times larger than that of the passage. The reservoir having a cross-section which is less than five times larger than that of the passage is not regarded as a reservoir, but constitutes a passage. For example, a cylinder having a diameter of 5 mm is regarded as a reservoir when compared with a cylindrical passage having a diameter of 1 mm. But, a cylinder having a diameter of 2 mm is not regarded as a reservoir.

It is a matter of course that the dimension of passages constituting the element according to the invention are not required to be uniform. A groove whose width and depth are in the order of 0.5 – 5 mm, particularly 1 – 3 mm or a circular hole whose diameter is in the order of 0.5 – 5 mm, particularly 1 – 3 mm may be used as the passage. The element according to the invention may locally include the reservoir or locally thick portion, but the main portion consists of the passages. The reservoir merely constitutes an auxiliary portion of the element according to the invention.

Methods of connecting the elements will be explained hereinafter. The elements according to the invention are connected each other to form a multi-stage passage network. The elements should be connected carefully in such a manner that the spinning materials are joined and separated in different phase in each element.

Figure 58:
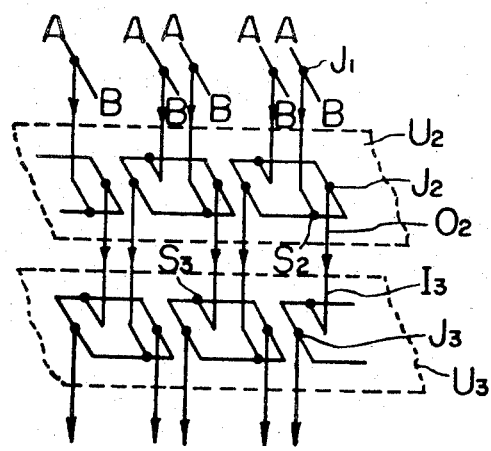
FIGS. 58, 59 and 60 show embodiments of three-dimensional passage network constructed by connecting the network elements in multi-stages.
Figure 60:
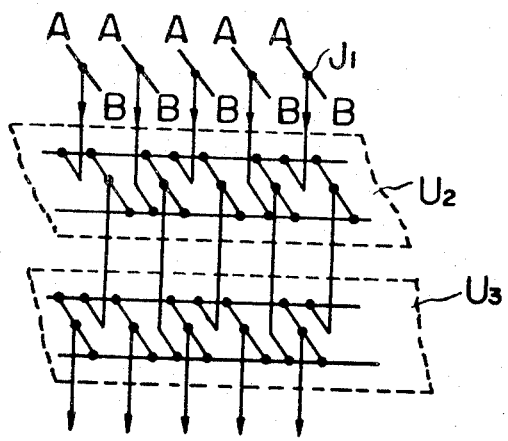

FIGS. 58, 59 and 60 show how to connect the elements of the invention already described with reference to FIGS. 19 – 30 in multi-stages.

Referring to FIG. 58, spinning materials A and B are joined at a point $J_1$ and fed into an element on a surface $U_2$. An outlet $O_2$ of the element on the surface $U_2$ is connected to an inlet $I_3$ of an element on a surface $U_3$. The joining direction in the first stage at $J_1$ is different from the separating direction in the second stage at $S_2$ by 90°. The separating direction at $S_2$ and the joining direction at $J_2$ are different by 90°. The joining direction at $J_2$ and the separating direction at $S_3$ are also different by 90°. Thus, the elements of the present invention are connected is series and in multi-stages, whereby spinning materials are joined and separated at multi-stages in different phase. It will be apparent that the elements on the surfaces $U_2$ and $U_3$ are the same as that shown in FIG. 33. FIG. 59 shows one embodiment in which the elements shown in FIG. 38 are connected in multi-stages. FIG. 60 shows one embodiment in which the elements shown in FIG. 43 are connected in multi-stages. Such a multi-stage connection can be applied to all of the embodiments of the elements described above.

It is desirable that the element has a regular shape in view of multi-stage connections of the elements and of the joinings at the first stage. Particularly, an element, in which the inlet and/or the outlet are arranged on a straight line or a gentle curve, such as a circle, on a surface U, is preferable, because such elements having the same construction can easily be connected by superposing them in multi-stages. For example, in FIGS. 38 – 48 the inlet I and the outlet O are positioned on the same line, and in FIGS. 35, 53 and 55 they are positioned on the different straight lines, and in FIGS. 57, 72 and 76 they are positioned on the same periphery of a circle. In each element shown in FIG. 54, the inlet I and the outlet O are positioned on separate straight lines, but when these passages are arranged in parallel, the main parts are positioned on the same straight lines as a whole.

However, according to the invention, it is not limitative that the inlets I or the outlets O are arranged on a straight line or a curve in the surface U. For example, a zigzag arrangement may be used. The inlet I and the outlet O must be arranged carefully so as that elements can easily be superposed and connected, and further that the spinning materials can be joined and separated in different phase efficiently.

The surface U, on which the elements are arranged, may be a plane or a curved surface. A gently curved surface is regarded as substantially a flat plane. For example, the surfaces of a cylinder and cone may be used as such surface U. However, in many cases, a plane is most effective. The inlet and outlet directions of the spinning materials are substantially perpendicular to the surface U. FIGS. 58, 59 and 60 show embodiments in which the direction is rectangular. It will be apparent from the perspective views shown in FIGS. 19 – 30 that the most suitable angle is a right angle. This angle need not be 90° and may for example, be 45°, if desired. However, the more the inlet and outlet angles of spinning materials against the surface are shifted from 90°, the more the mixing efficiency becomes lowered. The inlet and outlet directions of spinning materials should not be inclined from the perpendicular against the surface U by more than 45°.

A supplying portion of spinning materials should be connected to a mixing apparatus so as to obtain the highest mixing efficiency. Such a connection is very easy. FIGS. 58, 59 and 60 show the preferable embodiments.

The first stage joining of spinning materials at $J_1$ can be effected by any conventional joining methods, for example, methods used in spinning composite filaments. Side-by-side type and sheath-core type joining methods are known most widely. Particularly the side-by-side type joining method is most effective for the purpose of the present invention. Furthermore, a joining of 3 components as shown in FIG. 9 or a joining of more than 3 components can be used. The connection of a layer-multiplying mixer to spinning orifices can be effected in various ways. The outlet O at the last stage element may be directly connected to an orifice, and further a reservoir may be interposed between the outlet O and the orifice. It is also possible that a layer-multiplied spinning material flow and another flow are bonded and the resulting flow is supplied to the orifice.

The elements according to the present invention can be combined with each other or with another element, for example, an element having reservoirs. Furthermore, the spinning apparatus according to the present invention may incorporate therein filters, mechanical stirrers such as screws, and gear pumps. When the filters or mechanical stirrers are arranged in a layer-multiplying mixer or between a layer-multiplying mixer and a spinneret plate, spinning materials can be mixed into finely divided state, but the resulting filament has a non-continuous construction. It is not necessary that the spinning apparatus of the present invention is enclosed wholly in a spinning head. It is possible to put only the spinneret plate having orifices in the spinning head and to install the mixer in a separate place.

The passage network of the present invention can be easily constructed by superposing plates having holes and grooves formed in the upper and/or base surfaces thereof (This plate is called as a distributing plate.). Another effective method is to superpose plates having only holes. Furthermore, the above-mentioned two kinds of plates may also be combined.

As seen from the above and will be apparent from the following examples the spinning apparatus, particularly the distributing plate of the present invention constituting passage networks can be easily constructed, assembled and maintained. Therefore, extrememly complicated passage networks can be easily constructed. This advantage is obtained by the feature that the element is arranged on the surface U and spinning materials are flowed into or out at a direction substantially perpendicular to the surface U. Moreover, it will be seen that the branch M constitutes one of the features of the present invention, and plays an important role of joining and separating the spinning materials.

According to the spinning apparatus, particularly passage network of the present invention, uniform mixed filaments can be spun through a plenty of orifices, for example, more than four orifices, particularly more than eight orifices, in a high efficiency. The apparatus is preferably used in a spinneret having a cylindrical construction which is used most widely in the industrial production of filaments at prevent. Furthermore, as the mixer is constructed by passage networks, the stagnation or disturbance of spinning materials can be reduced and hence uniform filaments are obtained.

The elements of the layer-multiplying mixer according to the invention can be easily connected each other in series and in multi-stages, so that the number $n$ of joining and separating of spinning materials in different phase can be made sufficiently large. For example, it is very easy to make $n$ as large as 10 – 20, yet the apparatus becomes not so large. The thickness per one stage of the apparatus (the thickness of the distributing plate) can easily be made less than 20 mm, and distributing plates having a thickness of 2 – 10 mm are generally used. Therefore, even when $n$ is 10, the thickness of a mixer can be made less than 100 mm, so that sufficiently small-sized mixers can be obtained. Calculation shows that when $n$ is 10 in the mixer shown in FIG. 8, filaments composed of $2^{10}=1,024$ layers can be obtained.

The mix-spinning apparatus according to the invention can be used in substantially the same manner as used in the conventional conjugate spinning. That is, spinning materials to be mixed are separately fed into supplying portions at a velocity determined by the mixing ratio. As spinning materials, conventional fiber-forming materials, for example, polyamide; polyester; polyether; polyolefin; polyvinyl series copolymers, such as polyvinyl chloride, polystyrene, polyacrylonitrile, polyvinyl alcohol, etc.; polyurea; polyurethane and copolymers or modified polymers thereof are used, and furthermore, various materials, which cannot be used alone for fiber but can be used for mix-spinning, for example, polyalkylene glycol, and their derivatives, polyethyleneimine, polyisobutylene, etc., can also be used. The apparatus of the present invention is applied to wet-, dry- and melt-spinning methods and any other spinning methods.

The spinneret plate to be used in the present invention can be selected freely according to the purposes. Any desired number, arrangement and cross-sectional shape of the orifices can be selected suitably. Conventional spinneret plates can be used as such, if desired. Various filaments can easily be spun by changing spinneret plates. It is one of the advantages of the invention that the mixer can easily be connected to the spinneret plate as described above.

The invention will be explained more concretely in the following examples, which are not limitative within the scope of the invention.

Figure 61:
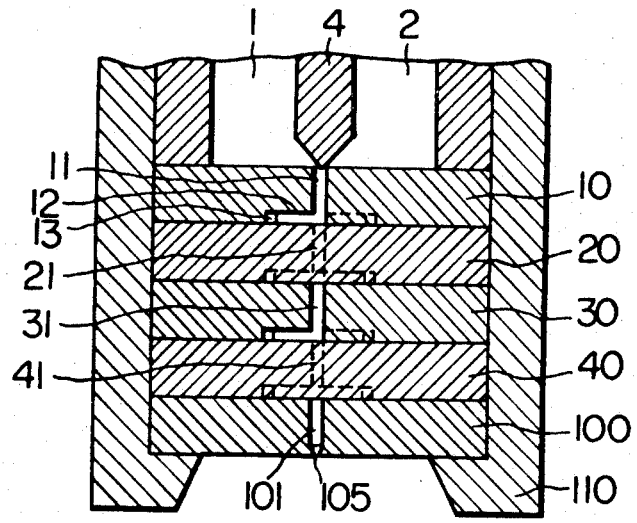
FIG. 61 is a vertical-sectional view of spinneret according to the invention.
Figure 62:
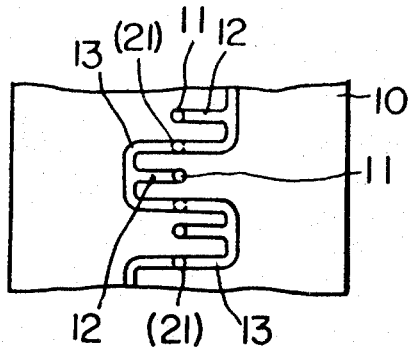
FIG. 62 is a base surface of a distributing plate shown in FIG. 61.

FIG. 61 is a vertical sectional view of the spinneret of the present invention. Four distributing plates 10, 20, 30 and 40 are inserted and superposed one upon the other between two reservoirs 1 and 2 supplying two spinning materials and a spinneret plate 100 to form a mixer, in which the spinning materials are joined and separated at 5 stages in different phase. Spinning materials in the reservoirs 1 and 2 are joined at the tip of a partition 4, and flow out from inlet holes 11 into passages 12 and 13 arranged in the base surface of the first-stage distributing plate 10. The base surface of the distributing plate 10 is shown in FIG. 62. Spinning materials flowed out from the inlet holes 11 into passages 12 and 13 formed in the base surface of the distributing plate 10 are separated and joined in the passages 12 and 13, and then flowed out through holes 21. The hole 21 is the second stage inlet holes. Therefore, the hole 21 serves as both of the outlet hole of the first stage and the inlet hole of the second stage. The element of the spinneret shown in FIG. 61 is the same in construction as that shown in FIG. 59. The construction of the first stage distributing plate 10 is the same as that of the second stage distributing plate 20, and these plates are slightly shifted by one-fourth the unit length of the unit passage (repeating unit) for the purpose of their connections. The above will be understood from the fact that the element in the surface $U_2$ is shifted from the element in the surface $U_3$ in FIG. 59. The outlet holes of the fourth stage distributing plate 40 in the spinneret shown in FIG. 61 are conduits 101 of the spinneret plate 100. The spinning materials are extruded from orifices 105 through the conduits 101. The numeral 110 represents a holder. The distributing plate may be provided at its upper surface with the element contrary to the case in which the distributing plate is provided at its base surface with the element as explained with reference to the spinneret shown in FIG. 61. Furthermore, the elements may also be arranged in the upper surface and in the base surface of the distributing plate respectively. FIG. 63 shows a distributing plate in which the element is divided into two portions and these element portions are arranged in the upper surface and in the base surface, respectively. When a plenty of distributing plates, in which the passages 13 arranged in the upper surface and in the base surface of a distributing plate are connected by means of holes 11, are superposed, an element having a construction substantially the same as that of the spinneret shown in FIG. 61 can be obtained. FIG. 64 shows the upper surface of the distributing plate shown in FIG. 63, and FIG. 65 shows the base surface of the plate.

In the mixing apparatus according to the invention, a distributing plate can be made by a combination of a plurality of plates. FIG. 66 is a vertical sectional view of a distributing plate made by a combination of three plates 10a, 10b and 10c. The plate 10a having passages 13 only, plate 10b having holes 11 only and plate 10c having passages 12 only are connected correctly by means of a pin 10d. FIG. 67 is a cross-sectional view of the distributing plate shown in FIG. 66 taken on line 1–1', which shows a communication of the hole 11 with the passage 13. FIG. 68 is a cross-sectional view of the spinneret shown in FIG. 66 taken on line 2–2'. FIG. 69 is a cross-sectional view of the spinneret shown in FIG. 66 taken on line 3–3', which shows a communication of the passage 12 with the next stage passage 23.

Holes of all of the plates shown in FIGS. 66 – 69 are composed of circular holes 11, and elongated holes 13 and 12, so that the plates can be easily manufactured. For example, punching method and chemically etching method are used. The plate, in which the passages (main passage and branch) are composed of grooves as shown in FIGS. 61 – 65, can be manufactured by chemically etching method or mechanically cutting method.

FIG. 70 is a vertical sectional view of a spinneret having a cylindrical construction.

Referring to FIG. 70, five distributing plates 10, 20, 30, 40 and 50 are arranged between a supplying portion consisting of two reservoirs arranged concentrically and circular spinneret plate 100. Spinning materials can be joined and separated at 5 stages in different phase. The fifth stage distributing plate 50 serves as a connecting plate rather than a distributing plate, and is arranged in order to connect the mixer with a spinneret plate 100. The spinning materials in the two reservoirs 1 and 2 are joined at the center of ducts 3, and the joined flow reaches passages 12 and 13 through inlet holes 11 at the first stage distributing plate 10. The passages 12 and 13 are grooves arranged in the base surface of the distributing plate 10. FIG. 71 is a cross-sectional view of the spinneret shown in FIG. 70 taken on line 4–4', which shows an arrangement of the duct 3 and the inlet hole 11. FIG. 72 is a cross-sectional view of the spinneret shown in FIG. 70 taken on line 5–5', which shows an arrangement of the passages 12 and 13 arranged in the base surface of the distributing plate 10. The connecting points of the passages 12 and 13 with the inlet holes of the next stage distributing plate, that is, the outlet points at the first stage are shown by dotted line circles 21.

In FIG. 72, outlets and inlets are arranged on a circle. The spinning materials are separated in a circumferential direction, and joined in a diametrical direction, these two directions being different from each other by 90°. It will be apparent that the element shown in FIG. 72 corresponds to that obtained by closing the element shown in FIG. 38. FIG. 73 is a cross-sectional view of the spinneret shown in FIG. 72 taken on line 6–6', which shows an arrangement of conduits 104 and orifices 105. In the spinneret shown in FIG. 70 the number of orifices 105 is 16, which is larger than the number of outlet holes 0 by 8, so that provision is made of a connecting plate 50 and a reservoir 106. As described above, the filters may be arranged in the reservoir, or interposed between distributing plates. However, it is desirable to arrange the filters before the reservoirs 1 and 2 in order to obtain a uniform continuous multi-layer filament.

It will be seen that the spinneret plate 100 shown in FIG. 70 is not of special structure, but is of usual structure, and it can be replaced by any other spinneret plates, which are different in the number and arrangement of orifices.

In the spinneret shown in FIG. 70, the passages are constituted by grooves and holes formed in the base surface of the distributing plate. The holes may be inclined in the distributing plate. In order to communicate easily each connecting portion in the passage, a small reservoir may be formed at the connecting portion. However, care must be taken so as not to cause the stagnation of spinning materials in the reservoir as possible as can. It is necessary the number of stages of joining and separating the spinning materials in different phase should be at least two. Usually from several to twenty stages are used. It will be apparent that a mixer having any numbers of stages can be very easily manufactured by superposing distributing plates.

In the spinneret shown in FIG. 70, a zigzag type element is used, and a spinneret using a ladder type element is shown in FIG. 74.

In the spinneret shown in FIG. 74 the number of joining and separating the spinning materials in different phase is 5. The spinneret shown in FIG. 74 is similar to that shown in FIG. 70, but they are different merely in the element, so that the spinneret will be easily understood. FIG. 75 is a cross-sectional view of the spinneret shown in FIG. 74 taken on line 7–7', which shows the arrangement of reservoirs 1 and 2 and ducts 3. FIG. 76 is a cross-sectional view of the spinneret shown in FIG. 74 taken on line 8–8', which shows one embodiment of the ladder type element formed in the base surface of a distributing plate 10 and closed in the shape of a circle. It will be apparent that the element shown in FIG. 76 corresponds to that shown in FIG. 45. A part of the grooves constituting the main passage shown in FIG. 76 is circular, so that it may easily be formed by cutting by means of a lathe. FIG. 77 is a cross-sectional view of the spinneret shown in FIG. 74, which shows that 16 orifices 105 are formed in a spinneret plate 10. As described above, the number and arrangement of orifices can be selected freely. When the number of orifices 105 is smaller than that of outlet passages 51 of a mixer, the number of layers in the resulting filament is often larger than the above-mentioned calculated value. On the contrary, even when the number of orifices 105 is larger than that of outlet passages 51, the number of layers is seldom decreased. In a cylindrical spinneret, orifices are preferably arranged in a circle or symmetrically with repeat to the center of the spinneret, because filaments are coagulated uniformly.

In the above-mentioned spinnerets (shown in FIGS. 61 – 77), one element is developed on one distributing plate. However, it is apparent that two or more elements are arranged in parallel, or that two kinds or more elements or unit passages are easily combined. Furthermore, in the spinnerets shown in FIGS. 70 and 74, it is easy that another spinning material is supplied from another passage and bonded with the spinning material flowed out from the outlet passage 51. For example, in the spinneret shown in FIG. 74, a passage penetrating the distributing plates at the center may be formed between the reservoir 2 and the reservoir 106, whereby a part of the spinning material in the reservoir 2 is directly supplied into the reservoir 106 and bonded with the spinning material flowed out from the outlet passage 51 of the mixer and then extruded through the orifice 105.

Suitable gaskets may be interposed between the distributing plates as usual in order to prevent leakage of the spinning material. A part of a distributing plate may be made of soft materials, such as aluminium and lead, whereby the plate can be additionally used as a gasket. The plate 10a or 10b of the distributing plate shown in FIG. 66 may be made of soft materials which serve as a gasket.

An orifice having a non-circular shape of opening may be used to obtain a filament having non-circular cross-section.

What is claimed is:

1. A mix-spinning apparatus for spinning at least two different kinds of spinning materials comprising
   I. a member for supplying at least two different kinds of spinning materials, a spinneret plate having at least one orifice, and a mixer for stratifying said spinning materials into multi-layers and interposed between the member and the spinneret plate,
   II. said mixer consisting of a three-dimensional passage network which includes at least two network elements disposed one upon the other in successive stages, an outlet portion of the network element at each stage being connected to an inlet portion of the network element of the next stage,
   III. the main part of said network element, including at least one, preferably at least two unit passages arranged on a substantial plane in a regular manner,
   IV. said unit passage including
      a. a main passage L having at least one branch M on a substantial plane and at least one inlet I through which the spinning materials flow in a direction substantially perpendicular to said plane and at least one outlet O through which the spinning materials flow out in a direction substantially perpendicular to said plane,
      b. said main passage being a closed zigzag form,
      c. said inlet I and outlet O being arranged alternately along said main passage,
      d. said inlet I being provided on said branch M or main passage L,
      e. said outlet O being provided on said branch M or main passage L,
   V. at least two different kinds of spinning materials supplied into said mixer being joined and separated at least two stages in different phase and flowed out from said orifice on the spinneret plate.

2. The spinning apparatus of claim 1 wherein said network element includes at least two types of unit passages connected to each other.

3. The spinning apparatus of claim 1 wherein said mixer is a combination of at least two kinds of network elements.

4. The spinning apparatus of claim 1 wherein said mixer consists of at least two kinds of said distributing plates superposed one upon the other.

5. A mix-spinning apparatus for spinning at least two different kinds of spinning materials comprising
   I. a member for supplying at least two different kinds of spinning materials, a spinneret plate having at least one orifice, and a mixer for stratifying said spinning materials into multi-layers and interposed between the member and the spinneret plate,
   II. said mixer consisting of a three-dimensional passage network which includes at least two network elements disposed one upon the other in successive stages, an outlet portion of the network element at each stage being connected to an inlet portion of the network element of the next stage,
   III. the main part of said network element, including at least one, preferably at least two unit passages arranged on a substantial plane in a regular manner,
   IV. said unit passage including
      a. a main passage L having at least one branch M on a substantial plane and at least one inlet I through which the spinning materials flow in a direction substantially perpendicular to said plane,
      b. said main passage being a closed ladder form,
      c. said inlet I and outlet O being arranged alternately along said main passage,
      d. said inlet I being provided on said branch M or main passage L,
      e. said outlet O being provided on said branch M or main passage L,
   V. at least two different kinds of spinning materials supplied into said mixer being joined and separated at least two stages in different phase and flowed out from said orifice on the spinneret plate.

6. A mix-spinning apparatus for spinning at least two different kinds of spinning materials comprising
   I. a member for supplying at least two different kinds of spinning materials, a spinneret plate having at least one orifice, and a mixer for stratifying said spinning materials into multi-layers and interposed between the member and the spinneret plate,
   II. said mixer consisting of a three-dimensional passage network which includes at least two network elements disposed one upon the other in successive stages, an outlet portion of the network element at each stage being connected to an inlet portion of the network element of the next stage,
   III. the main part of said network element, including at least one, preferably at least two unit passages arranged on a substantial plane in a regular manner,
   IV. said unit passage including
      a. a main passage L having at least one branch M on a substantial plane and at least one inlet I through which the spinning materials flow in a direction substantially perpendicular to said plane and at least one outlet O through which the spinning materials flow out in a direction substantially perpendicular to said plane,
      b. said main passage being a closed lattice form,
      c. said inlet I and outlet O being arranged alternately along said main passage,
      d. said inlet I being provided on said branch M or main passage L,
      e. said outlet O being provided on said branch M or main passage L,
   V. at least two different kinds of spinning material supplied into said mixer being joined and separated at least two stages in different phase and flowed out from said orifice on the spinneret plate.

* * * * *